United States Patent [19]
Fletcher

[11] Patent Number: 5,790,346
[45] Date of Patent: Aug. 4, 1998

[54] DISK CLAMP FOR A DISK DRIVE FOR EVENLY DISTRIBUTING CLAMPING FORCE ON RECORDING MEDIUM

[75] Inventor: John Francis Fletcher, Scotts Valley, Calif.

[73] Assignee: Western Digital Corporation, Irvine, Calif.

[21] Appl. No.: 674,769

[22] Filed: Jun. 28, 1996

[51] Int. Cl.$^6$ .............................. G11B 17/02; G11B 23/00
[52] U.S. Cl. .............................. 360/99.12; 369/270
[58] Field of Search ........................... 360/99.12, 99.08, 360/98.07, 98.01, 98.08; 369/270, 271

[56] References Cited

U.S. PATENT DOCUMENTS

| | | | |
|---|---|---|---|
| 4,502,136 | 2/1985 | Rickert et al. | 369/271 |
| 4,539,614 | 9/1985 | Thompson | 360/99 |
| 4,541,086 | 9/1985 | Tanaka | 369/271 |
| 4,881,745 | 11/1989 | Peters | 279/4 |
| 5,031,061 | 7/1991 | Hatch | 360/98.07 |
| 5,043,973 | 8/1991 | Ocheltree et al. | 369/270 |
| 5,048,005 | 9/1991 | Eckhoff | 369/270 |
| 5,056,082 | 10/1991 | Ekhoff | 369/270 |
| 5,134,532 | 7/1992 | Svendrsen et al. | 360/106 |
| 5,166,920 | 11/1992 | Kogure | 269/270 |
| 5,270,999 | 12/1993 | Chessman et al. | 369/290 |
| 5,295,030 | 3/1994 | Tafreshi | 360/99.12 |
| 5,392,178 | 2/1995 | Nishio et al. | 360/99.12 |
| 5,490,024 | 2/1996 | Briggs et al. | 360/99.12 |
| 5,504,638 | 4/1996 | Kinoshita et al. | 360/99.12 |
| 5,517,376 | 5/1996 | Green | 360/99.12 |
| 5,528,434 | 6/1996 | Bronshvatch et al. | 360/99.12 |

FOREIGN PATENT DOCUMENTS

| 1183149 | 7/1959 | France | 369/270 |
|---|---|---|---|

OTHER PUBLICATIONS

IBM Technical Disclosure Bulletin (vol. 16, No. 11 Apr. 1974, p. 3763).
IBM Technical Disclosure Bulletin (vol. 26, No. 12, May 1984), p. 6632.
IBM Technical Disclosure Bulletin (vol. 26, No. 6, Nov. 1983), p. 2939.

*Primary Examiner*—Allen Cao
*Attorney, Agent, or Firm*—Leo J. Young; W. Chris Kim; Milad Shara

[57] ABSTRACT

A disk clamp for holding a recording disk in a disk drive. The clamp is ring-shaped and includes stiffened inner and outer regions with a softened middle region located in between. The inner region is stiffened by bending the inner edge. The outer region is stiffened by involuting the outer edge back on itself. A disk contact zone is included in this outer region. The clamps may be made of sheet metal, such as stainless steel.

17 Claims, 6 Drawing Sheets

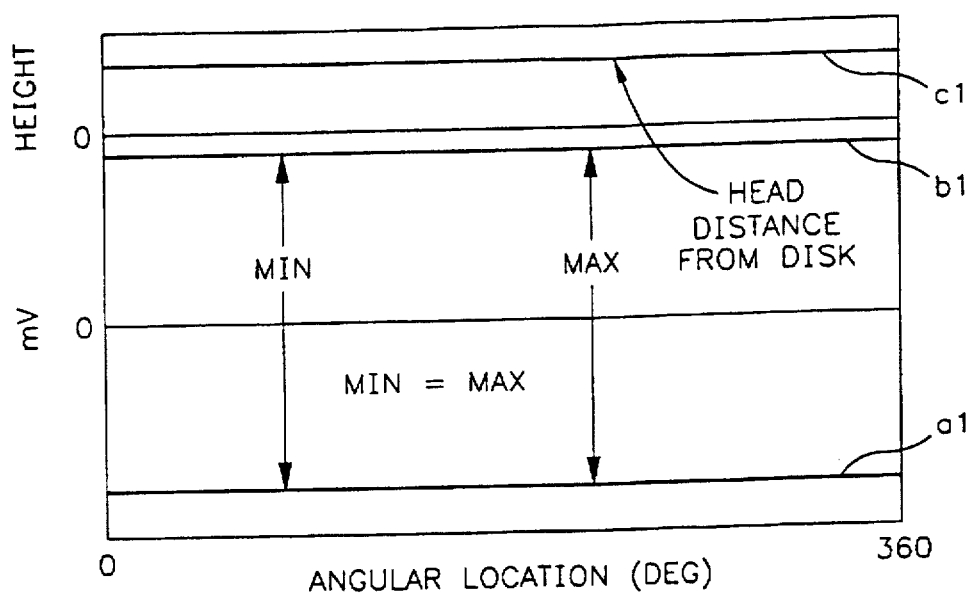
FIG. 1  VOLTS & HEAD HEIGHT VS. ANGULAR LOCATION
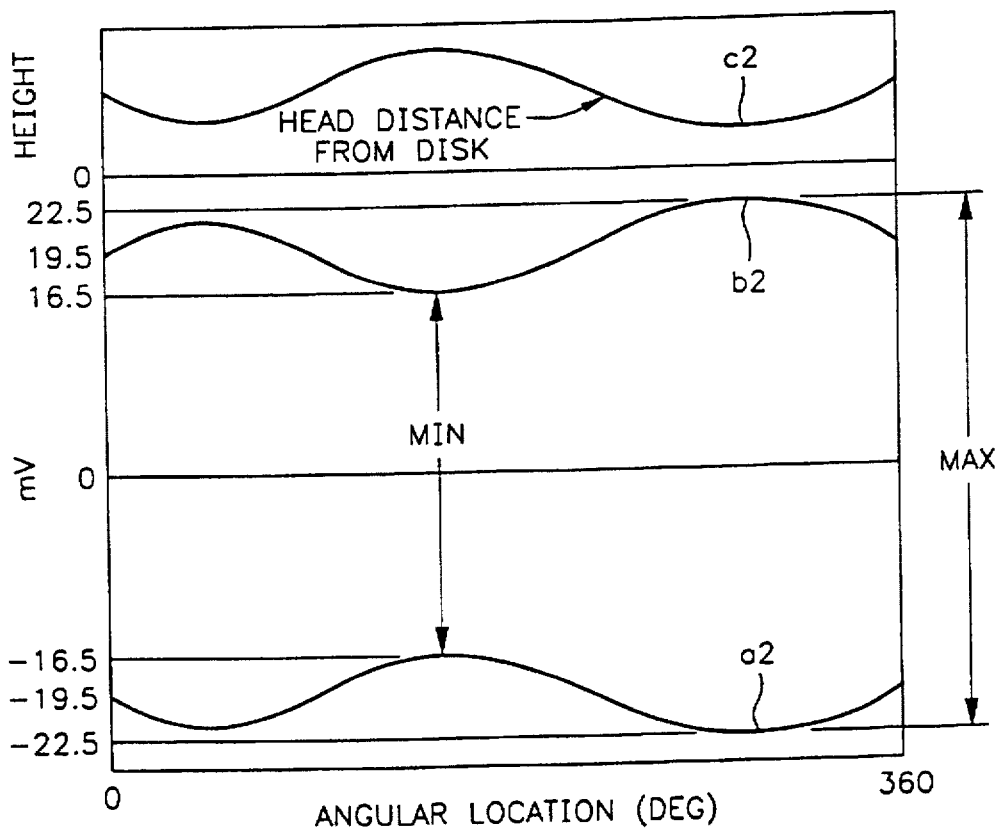
FIG. 2
(PRIOR ART)  VOLTS & HEAD HEIGHT VS. ANGULAR LOCATION

AXIAL CLAMPING FORCE VS. ANGULAR POSITION

DISK CLAMP FOR A DISK DRIVE FOR EVENLY DISTRIBUTING CLAMPING FORCE ON RECORDING MEDIUM

BACKGROUND OF THE INVENTION

1. Field of the Invention

This invention relates generally to disk clamps used for securing recording disks in a computer disk drive and more particularly to a disk clamp for evenly distributing axial clamping forces on such a recording disk to minimize clamping deformation of the disk.

2. Description of the Related Art

A computer typically includes one or more disk drives that provide economical, non-volatile storage for relatively large quantities of data. A typical disk drive includes one or more disks stacked and spaced apart on the hub of a motor-driven spindle. A thin magnetic film is deposited on each disk surface, usually on both sides. The magnetized surfaces spin in close proximity to a series of read/write heads attached to moveable arms.

Each head consists of a magnetic yoke and a magnetizing coil. Digital information can be stored on the disk by applying current pulses of suitable polarity to the magnetizing coil. This causes the magnetization of the disk in the area immediately underneath the head to be switched into a direction parallel to the applied field.

The same head can act as a sense coil for reading the stored information. In this case, changes in the magnetic field resulting from the movement of the film relative to the yoke induces a voltage in the coil. The induced voltage is communicated to circuitry that translates it into data.

In non-contact recording, the read/write head flies on a very thin layer of air above the magnetic surface of the disk. The distance from the surface of the disk to the bottom of the read/write head is commonly referred to as the flying height of the head. During a read operation, the amplitude of induced voltage in the coil is affected by this flying height. Generally, the closer the head is to the disk surface, the stronger the magnetic field. The flying height ideally remains unchanged but it is practically affected by a complex interaction of many variables.

Researchers in the field have discovered that the amount of compressive force applied to a recording disk to hold it in place on the spindle motor hub affects flying height by slightly deforming the disk. Usually, the force is applied in an axial direction (normal to the disk surface) by a ring-shaped clamp that fits over the hub and presses on an inner portion of the disk surface. The deformation results from uneven clamping force distribution. The clamping force is typically greater at the locations of fasteners (e.g. screws) for attaching the clamp to the spindle hub and the disk tends to deform proportionally to the amount of force pressing against it. When this force varies according to the angular location around the disk, the disk deforms accordingly. Such a deformed disk is often wave-shaped like a cooked potato chip with peaks and valleys that change the apparent flying height.

FIG. 1 is a compound graph showing an ideal model for the relationship of the flying height of a head relative to the surface of a disk. It also shows the induced voltage at the head while flying at a particular height. Height and voltage changes are plotted relative to an angular location relative to the disk. In the top-part of the graph, straight line c1 represents the flying height of the head relative to any angular location on the disk surface. This indicates that in an ideal situation flying height remains the same regardless of the angular location of the head relative to the disk. Accordingly, the induced voltage or "readback signal" at the head does not vary in response to flying height changes. This is shown by straight lines a1 and b1 on the compound graph showing that the same readback signal is experienced at the head regardless of angular location relative to the disk. Variables that influence flying height other than disk deformation are ignored for the sake of simplicity.

Regarding the nomenclature and terminology of the compound graphs used in this specification (FIGS. 1, 2, and 7), note that no particular units or dimensions are used in describing the flying height. This is because the important consideration is simply whether height changes as a function of angular location. The function is generally described by the shape of the curve. In other words, more pronounced changes in height show up on the curve as steep curve transitions. Height changes directly effect the strength of the signal. This phenomenon is referred to as readback signal modulation. Accordingly, the curves illustrating the readback signal modulation reflect the shape of the height modulation curve.

A value for readback signal modulation (RSM) can be calculated for the purposes of relative comparison by applying the following equation:

$$RSM = \frac{Max - Min}{Max + Min} * 100 \qquad [\text{Eqn. (1)}]$$

where "Max" denotes the maximum induced voltage and "Min" denotes the minimum induced voltage, and RSM is expressed as a percentage value.

Further regarding terminology, note that voltage is presented as occurring partially above an arbitrary "zero" point (line b1) and partially below (line a1). This is a matter of convenience and represents the way that such signals are usually measured using an oscilloscope. "Max" and "Min" represent the amplitude of the waveform measured from peak-to-peak. In FIG. 1, Max=Min because there is no variance in either a1 or b1. This of course is the ideal case.

FIG. 2 illustrates the above-described phenomenon of readback signal modulation compared to height modulation and is a compound graph adhering to the principles described above with reference to FIG. 1. FIG. 2 shows the result of the uneven distribution of clamping force induced by a typical prior art clamp. Curve c2 shows the change in flying height caused by the disk deformation. The readback signal curves b2 and a2 are inversely proportional in shape to height curve c2. Note that the maximum (Max) voltage is measured at the head when it is at about 320 degrees relative to the disk. In this case the value of Max is about 45 mv (22.5 mv+22.5 mv). The minimum (Min) voltage occurs when the head is at about 180 degrees relative to the disk. In this case the value of Min is about 33 mv (16.5 mv+16.5 mv). In this example, the RSM value is about 15.5%.

FIG. 3 is a graph illustrating axial clamping force plotted against angular position of a prior art clamp 10 relative to a disk surface 12 in clamp/disk contact region. The force distribution is illustrated by curve 13. The representation illustrated is derived from data compiled from a finite-element analysis of a prior art clamp that has a cross-sectional profile as shown in FIG. 3. This prior art clamp is not the same clamp described with reference to FIG. 2. The greatest component of the compressive force on disk 12 is the pressing forces 20 (represented by force vectors F) initiated by fasteners used to attach clamp 10 to the spindle hub. A lesser component (not shown) is introduced by the weight of the clamp.

The aggregate forces are distributed along the contact surface equal to the resultant force $F_{AGP}$ exerted by the disk on the clamp to resist the total aggregate clamping force (not shown for simplicity). The forces are equal because the disk and clamp are at static equilibrium. It is this resisting force that is actually plotted to derive curve 13. It can be seen that the maximum force of 12 pounds is about 8 times greater than the minimum force of about 1.5 pounds.

Using a formula analogous to that used to calculate RSM, the inventor has calculated a term to describe how evenly a force is distributed. It is referred to as force modulation (FM) and calculated as follows:

$$FM = \frac{Max - Min}{Max + Min} \times 100 \quad \text{[Eqn. (2)]}$$

where "Max" refers to the maximum force and "Min" to the minimum force, and FM is expressed as a percentage value. Thus, for the prior art clamp whose force distribution curve is shown in FIG. 3, the FM is about 80%.

An ideal FM value would be about zero just as an ideal RSM value would be about zero. This would be the case if the clamping force were so well distributed that the axial force measured at each angular location was equal (i.e. Max=Min). Nevertheless, the inventor has recognized that the need to maximize economy must be balanced against the ideal model. Therefore, there is a need for an inexpensive yet effective means for distributing clamping force.

The prior art is replete with efforts to more evenly distribute pressure on a recording medium but most are quite costly. For example, U.S. Pat. No. 5,270,999 discloses an apparatus for reducing disk distortion requiring a special hub including a spring and retainer. The retainer has a conical surface for mating with a similar surface on a motor hub. The hub includes a cut-out portion for receiving the spring. When a recording disk is placed on the hub, the retaining member engages the disk while the spring holds the retainer member in place. This is an uneconomical solution because it specifies exacting standards for an entire disk drive. Further in practice it obsoletes existing drive designs.

U.S. Pat. No. 5,048,005 discloses a clamping member that secures a data disk by means of a lock member having axially extending fingers arranged about its circular center. The fingers are said to evenly distribute the clamping force about the disk contact surface. This part is expensive to manufacture because the fingers must be machined to precise dimensions. Further, accommodating for the height of the fingers may introduce spacing problems as manufacturing tolerances build up.

A similar solution is disclosed in U.S. Pat. No. 5,166,920. It describes a clamp member having a plurality of claws for pressing a disk against a hub. This arrangement is also described as evenly distributing axial clamping forces on the disk surface. This solution has similar disadvantages to those described above with reference to U.S. Pat. No. 5,048,005.

Another known prior art solution involves machining or stamping a clamp from a solid piece of metal. Material is extruded from the solid piece to yield a clamp thicker in some portions than others. The thicker portions are more rigid than the thinner portions. Varying the rigidity like this relieves stresses in the clamp and helps to distribute clamping force. Unfortunately, the machining process is expensive and extruded material is wasted.

Merely including a softening geometric feature in a disk clamp is known. In fact, a prior art clamp implemented by the assignee of this patent application is softened by using a geometry that must be machined from a solid cylindrical aluminum bar at significant cost to produce a clamp having a less-stiff middle region sandwiched between a stiffened inner region and a stiffened outer region. The clamp is very expensive to fabricate because it was necessary to extrude material from the solid bar to create the softened region of the clamp. It is very expensive to machine solid metal and inexpensive sheet metal cannot be used to produce the prior art clamp geometry.

It would be desirable to achieve an economical solution for evenly distributing axial clamping force along the contact surface of a recording disk. The problem of unevenly distributed clamping force is clearly felt in the art and is solved by this invention in the manner described below.

SUMMARY OF THE INVENTION

The disk clamp of this invention has an annular body that fits over a disk drive spindle motor hub and presses on a recording disk surface. The body includes stiffened inner and outer peripheral regions and a relatively softer middle region in between. The inner region includes a bent inner edge. The outer region includes an outer edge that is involuted to form a stiffened outer peripheral region having a disk surface contact zone disposed to push against the clamped disk surface.

An object of this invention is to provide a low cost disk clamp for evenly distributing axial clamping forces on a recording disk used in a computer disk drive. An advantage of this invention is the clamp geometry, which substantially evenly distributes the clamping pressure on the disk. It is a feature of this invention that the clamp is easy to manufacture and is therefore relatively low in cost. It can easily be made of relatively low-cost sheet metal, such as stainless steel, without requiring stamping. Preferably, holes are provided in the clamp to allow fasteners to engage corresponding holes on the spindle motor hub.

The foregoing, together with other features and advantages of this invention, may become more apparent when referring to the following specification, claims, and accompanying drawings.

BRIEF DESCRIPTION OF THE DRAWINGS

For a more complete understanding of this invention, reference is now made to the following detailed description of the embodiments illustrated in the accompanying drawings, wherein:

FIG. 1 is a compound graph showing an ideal model of the flying height of a read/write head relative to a magnetic surface of a recording disk and also the corresponding induced voltage measured at the read/write head;

FIG. 2 is a compound graph representing the same relationship depicted in FIG. 1 but illustrating a disk drive configuration using a prior art clamp;

DESCRIPTION OF A PREFERRED EMBODIMENT

Figure 3:
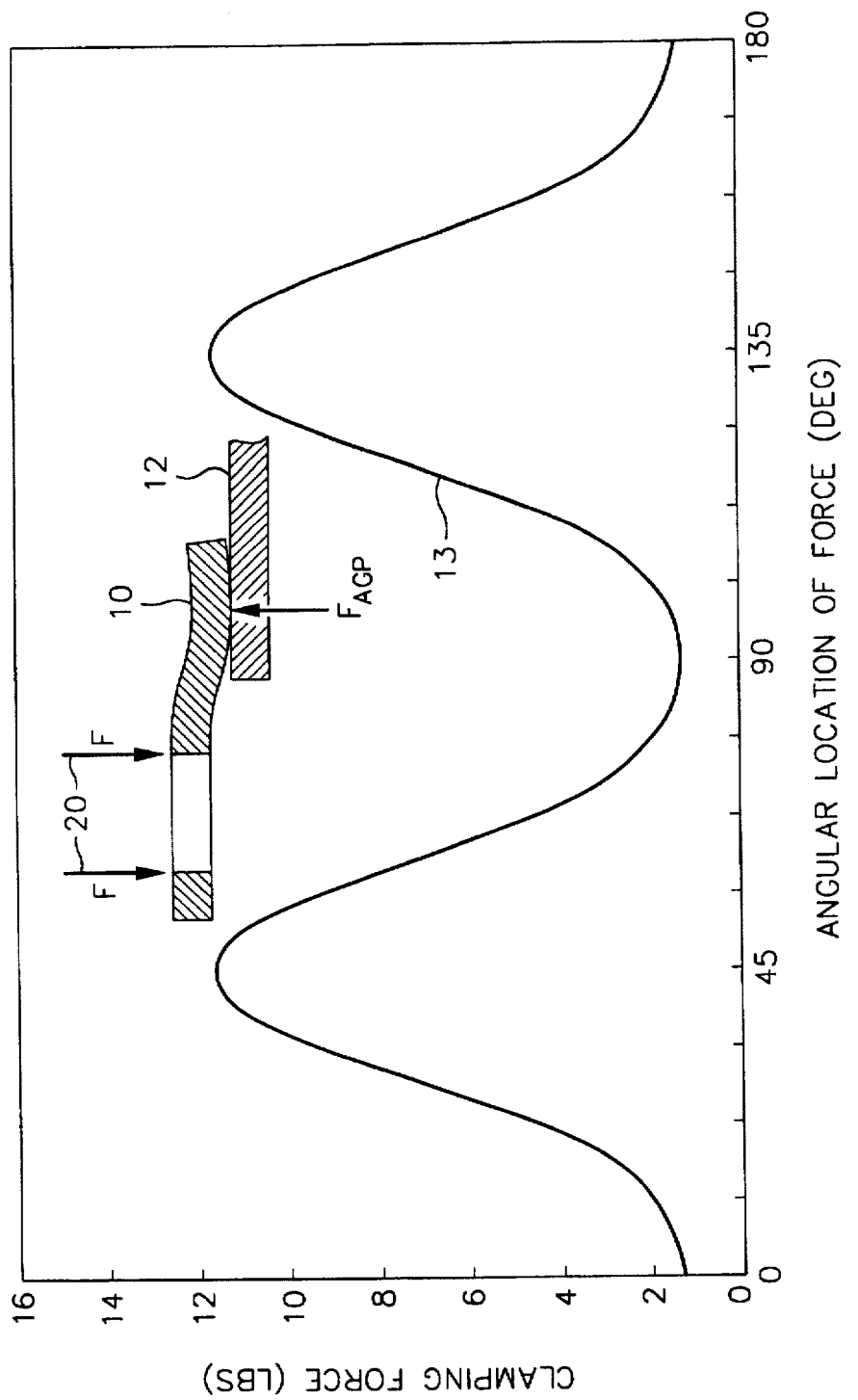
FIG. 3 is a simplified graph of axial clamping force measured at a contact surface on a disk and plotted relative to an angular position on the disk for another disk drive configuration using a prior art clamp.
Figure 4:
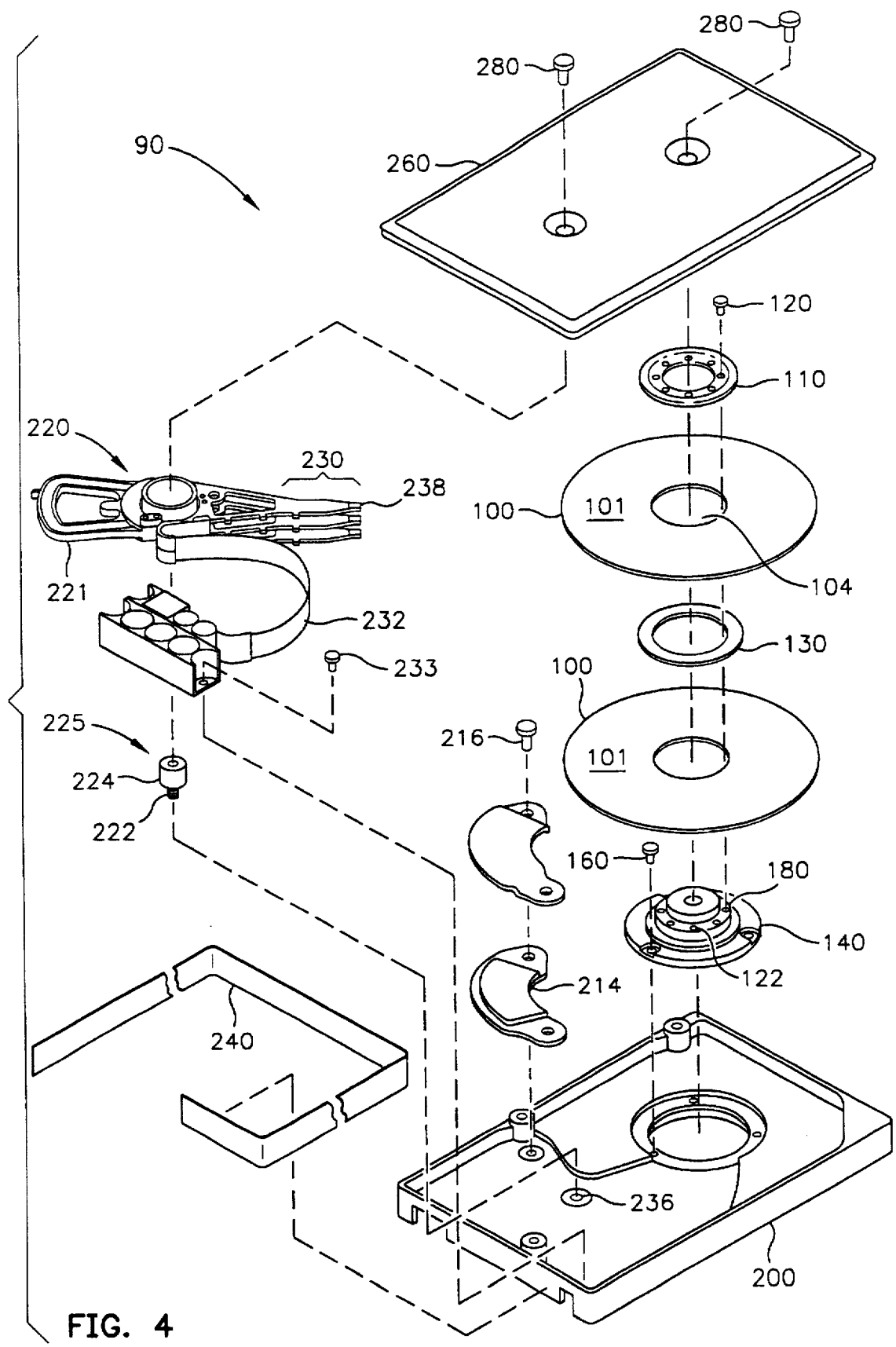
FIG. 4 is an exploded view of a disk drive embodying this invention and including a disk clamp for distributing axial clamping forces on a recording disk used in the disk drive.

As illustrated in FIG. 4, a disk drive 90 includes housing 200 for holding the operational components of drive 90. A spindle motor 140 is securably mounted in housing 200 by fasteners 160 and includes a rotary hub 180 for rotating at least one recording disk 100. Disk 100 is fixedly-mounted to hub 180 by a disk clamp 110. A plurality of fasteners 120 fix the clamp to hub 180 and a spacer 130 separates each disk 100 from another. Each disk has at least one recording surface 101 on which magnetic information is recorded by a read/write head 238. Disk 100 includes a central opening 104 to allow passage of fasteners 120 and attachment to hub 180. Spindle motor 140 includes one or more hub holes 122 for receiving a fastener.

An actuator assembly 220 is mounted for rotary motion with respect to housing 200 on a base-mounted pivot device 225 including a journal 222 and bushing 224. Housing 200 includes a complimentary receptacle 236 for receiving pivot device 225. Actuator assembly 220 includes a coil 221 that operates in conjunction with voice coil motor 214. A plurality of fasteners 216 secure voice coil motor 214 to housing 200. Actuator assembly 220 includes at least one movable arm member 230 coupled to read/write head 238. Spindle motor 140 rotates the disk and, in response to the acceleration current generated by voice coil motor 214, actuator arm 230 moves head 238 across disk 100 to access magnetically encoded data.

A flex circuit 232 provides electrical connections between actuator assembly 220 to a controller (not shown) for transmitting operational commands and communicating data. A fastener 233 secures a bracket attached to flex circuit 232 to housing 200.

A cover 260 encloses the operational components in housing 200 and is connected by fasteners 280 to spindle hub 180 and journal 222. The cover 260 is joined to housing 200 by sealing tape 240.

Figure 5:
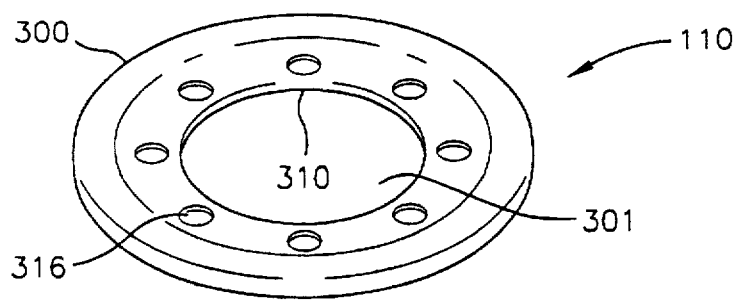
FIG. 5 is a perspective view of the disk clamp used in the disk drive of FIG. 4.

Referring to FIGS. 4 and 5, disk clamp 110 has a substantially annular body 300. Clamp 110 has a central opening 301 sized to receive a portion of spindle hub 180 such that an inner edge 310 abuts hub 180. A plurality of clamp holes 316 are disposed in body 300 to align with a corresponding one of a plurality of hub holes 122 (FIG. 4). A corresponding one of a plurality of fasteners 120 (FIG. 4) for coupling disk clamp 110 to rotary hub 180 are each received in respective clamp holes 316 and then into corresponding hub hole 122.

Figure 6A:
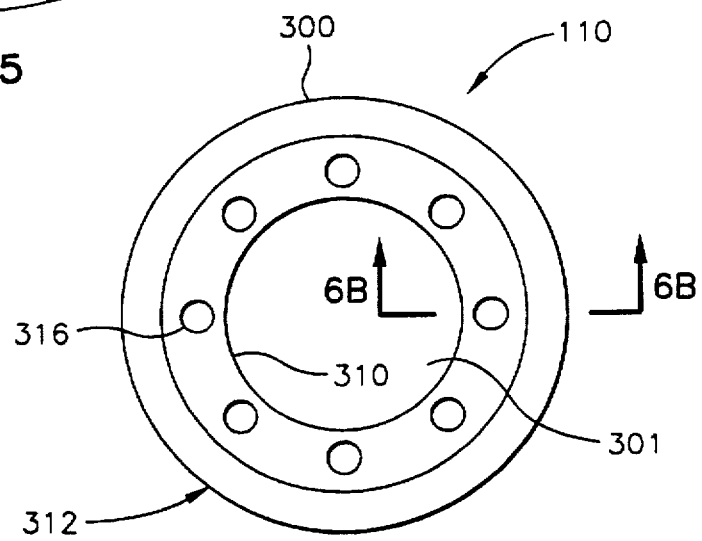
FIG. 6A is a plan (top) view of the disk clamp of FIG. 5.
Figure 6B:
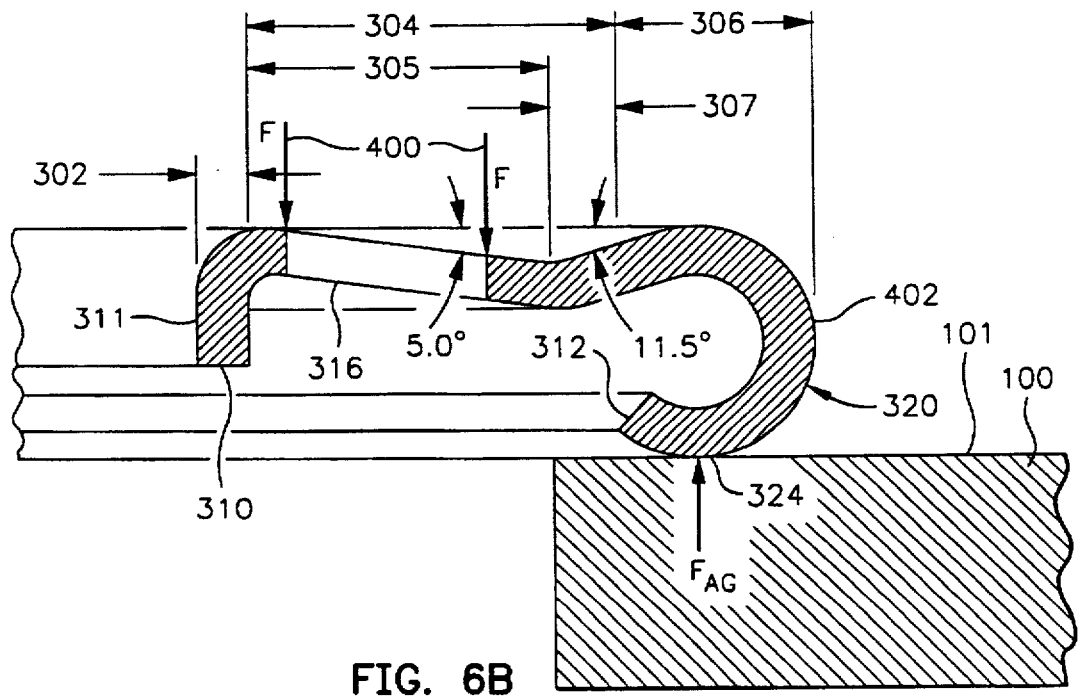
FIG. 6B is a sectional view of the disk clamp of FIG. 5A taking along sectional lines 5B—5B.

FIGS. 6A and 6B show plan and sectional views of clamp 110, respectively. Inner edge 310 is bent to form a stiffened inner peripheral region 302. Region 302 includes a portion 311 which extends towards recording surface 101. An integral middle region 304 is adjacent inner peripheral region 302 and includes a plurality of clamp holes 316. Middle region 304 of disk clamp 110 includes a declination region 305 adjacent the inner peripheral region 302. An inclination region 307 is disposed on the opposite end of declination region 305. Although not critical to the function of the clamp, the inventor suggests inclination and declination angles of about 5° and 11.5° from the horizontal as shown in FIG. 6B.

A stiffened outer peripheral region 306 is adjacent inclination region 307 and is formed by curling or involuting an outer edge 312 to describe at least part of a substantially toroidal surface. Region 306 has a cross section 402 that defines a curl; the curl defines an axis which is parallel to recording surface 101 and extends through an angle which is greater than 180 degrees. This toroidal surface includes a disk surface contact zone 324 for contacting recording disk surface 101. A reactive force FAG exerted upwards by disk 100 in contact zone 324 is equivalent to the aggregate clamping force, including fastening forces 400, applied by clamp 110. FAG is equal to the total clamping force because the clamp 110 and disk 100 are in static equilibrium.

The stiffness of middle region 304 is substantially less than the stiffness of either of inner peripheral region 302 or outer peripheral region 306. Outer peripheral region 306 is slightly less stiff than inner peripheral region 302. Empirical results of a finite-element analysis (discuss below with reference to FIG. 8) shows that this geometry substantially evenly distributes the aggregate clamping force.

The inventor's geometric configuration with the involuted or folded regions 306 bent downward and then away from disk surface 101 is counter-intuitive in view of the prior art. The machined aluminum clamp of the prior art has a stiffened region but it is bent away from and never toward disk surface 101. Bending the edge toward and then away from the contact surface as done with clamp 110 is unexpectedly advantageous and yields unexpectedly superior force modulation and cost.

The prior art disk clamp is typically made using standard metal stamping tools. The inventor has found that the clamp of this invention is best made with a transfer eyelet press of the kind commonly used in the shoe industry to make shoe eyelets. The use of such a press is heretofore unknown in the disk drive industry.

The inventor estimates that the cost of a clamp made in accordance with the teachings of this invention is about one-sixth of the price of the machined clamp known in the art. Fabrication costs include the cost of forming the sheet metal into a clamp and the cost of cleaning the formed clamp to eliminate contamination from the disk drive interior. The inventor has found that, without special optimization, existing cleaning methods are more costly when applied to the clamp of this invention but that the savings in metal-forming costs are very substantial. It is preferred that clamp 110 be made of stainless steel sheet metal using ASTM grade 302 material. Preferably, outer peripheral region 306 is formed by curling the sheet metal to describe at least part of a toroidal surface.

Figure 7:
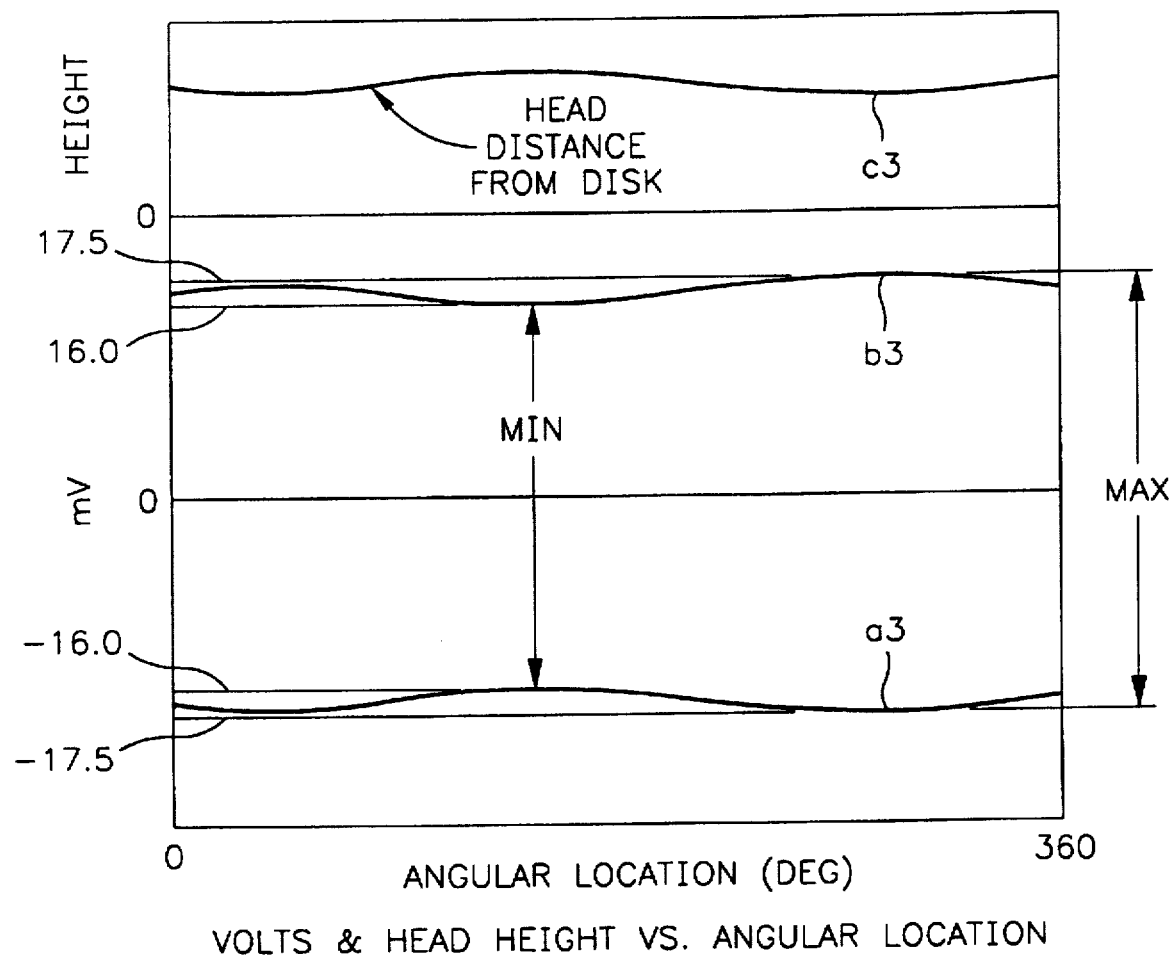
FIG. 7 is a compound graph depicting the same relationship illustrated in FIG. 2 but for the disk drive of FIG. 4 employing the disk clamp of FIGS. 5, 6A and 6B.

A compound graph similar to the graph shown in FIGS. 1 and 2 is described below with reference to FIG. 7. Because clamp 110 does not deform the disk as much as the prior art clamp discussed with reference to FIG. 2, the readback signal modulation (RSM) calculated when using clamp 110 in a disk drive is significantly smaller. Although it is possible to construct a clamp having an even better RSM value, clamp 110 yields a substantially better RSM value than a typical prior art clamp and at a substantially lower cost. Curve c3 is smoother than curve c2 of FIG. 2 illustrating that the flying height is held more constant using clamp 110. Accordingly, voltage-describing curves b3 and a3 are smoother indicating less variance (compare to b2 and a2; FIG. 2). The RSM value is about 4.5% ((35−32)/(35+32)× 100%). This is significantly better than the typical prior art clamp illustrated in FIG. 2 with an RSM value of about 15.5%.

Figure 8:
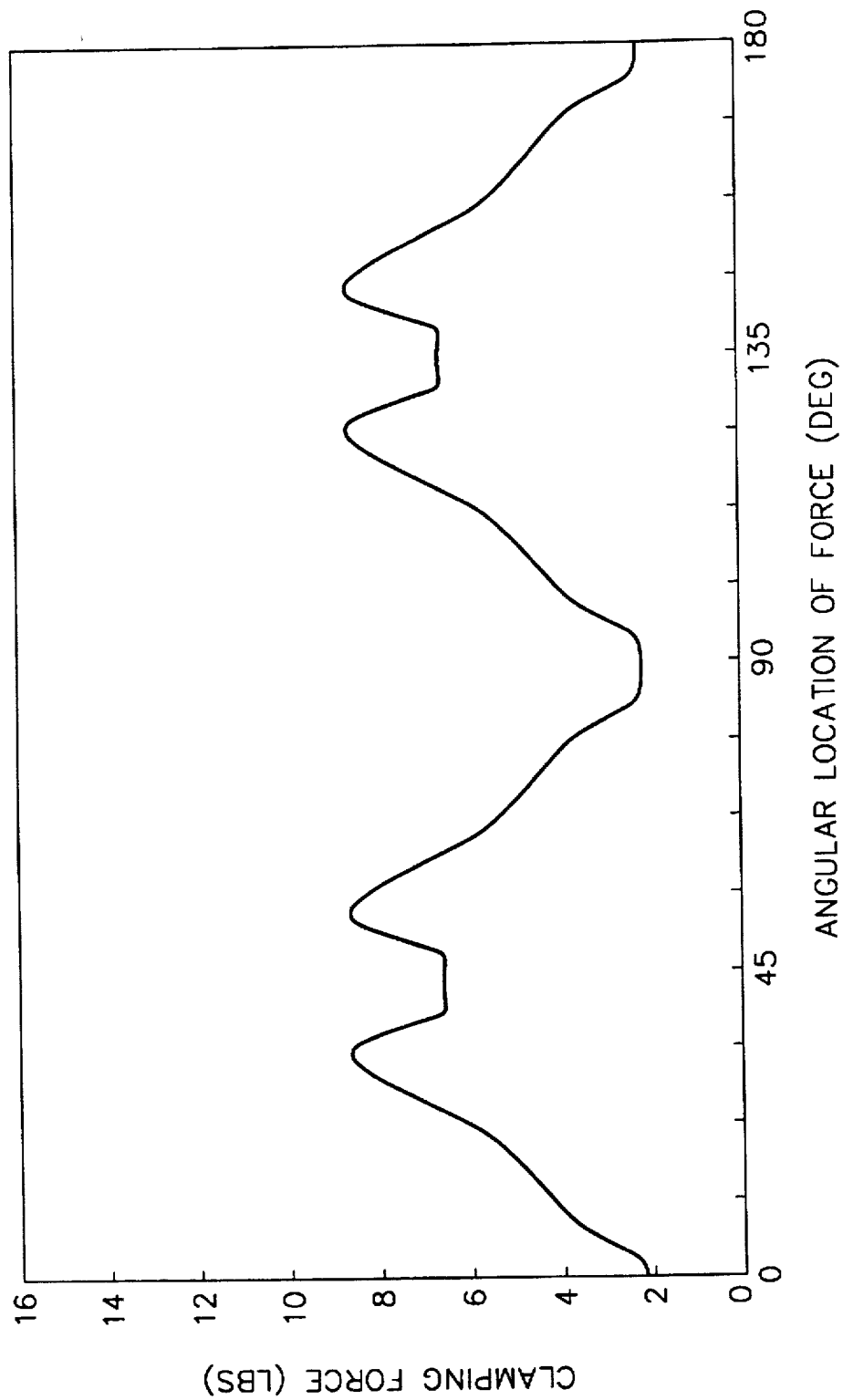
FIG. 8 is a simplified graph of axial clamping force of the clamp of FIGS. 5, 6A, and 6B measured on a contact surface of a recording disk included in the disk drive of FIG. 4 and plotted relative to an angular location on the recording disk.

FIG. 8 shows the results of a finite-element analysis and describes distributed axial clamping force plotted against angular position of the head relative to disk surface 101. The plotted force is the resultant aggregate force FAG measured in contact region 324 (FIG. 6A). It can be seen that the maximum clamping force is about 8.5 pounds and the minimum clamping force is about 2 pounds. Thus, the ratio of these forces is about 4 to 1. Using these maximum and minimum values in the force modulation (FM) equation described above with reference to FIG. 2, the FM value is seen to be about 60%. Recall that the FM value of the prior art configuration discussed above with reference to FIG. 2 is about 85%. Also the ratio of force to the minimum force yield a ratio of about 6 to 1. Thus, it can be seen that the clamp of this invention substantially improves the distribution of force over disk surface 101. And it does so at a significantly lower fabrication cost than prior art solutions.

Modifications and alternative embodiments for practicing this invention may occur to those skilled in the art, in view of the teachings above. Therefore, this invention is not to be limited in any way except by the appended claims below and their equivalents.

We claim:

1. A disk drive comprising:
   a housing;
   a spindle motor mounted in the housing and having a rotary hub with a plurality of hub holes;
   a disk having a recording surface and an opening for engaging the rotary hub;
   a disk clamp for securing the disk to the rotary hub, the disk clamp comprising;
      a substantially annular body, the annular body having a stiffened inner peripheral region, a stiffened outer peripheral region, and a middle region between the inner and outer peripheral regions having substantially less stiffness than either of the inner and outer peripheral regions and having a plurality of clamp holes, the inner peripheral region including a bend and a portion extending from the bend towards the recording surface, the outer peripheral region having a cross section that defines a curl, the curl including a portion extending toward the recording surface and including a disk surface contact zone, the curl defining an axis which is parallel to the recording surface, the curl extending through an angle which is greater than 180 degrees; and
   a plurality of fasteners, each for passing through one of the clamp holes in the middle region of the disk clamp and engaging one of the hub holes to secure the disk clamp to the rotary hub.

2. The disk drive of claim 1 further comprising:
   in the disk clamp, the plurality of clamp holes each disposed to align with a corresponding one of the hub holes.

3. The disk drive of claim 2 wherein the plurality of fasteners for coupling the disk clamp to the rotary hub are each received through a respective clamp hole into the corresponding hub hole to impose on the disk clamp a respective portion of an aggregate axial clamping force for securing the disk to the rotary hub.

4. The disk drive of claim 3 wherein the middle region stiffness is sufficiently low with respect to the inner and outer peripheral region stiffness to distribute the aggregate axial clamping force over the disk surface contact zone of the disk clamp.

5. The disk drive of claim 4 wherein the disk clamp middle region stiffness is such as to distribute the aggregate axial clamping force over the disk surface contact zone with a maximum-to-minimum force ratio of about four-to-one.

6. The disk drive of claim 3 wherein the plurality of fasteners includes threaded machine screws.

7. The disk drive of claim 1 wherein the disk clamp consists essentially of an annular piece of sheet metal in which the disk surface contact zone is formed by curling the sheet metal to define at least part of a substantially toroidal surface in the outer peripheral region.

8. The disk drive of claim 7 wherein the sheet metal consists essentially of steel.

9. The disk drive of claim 1 further comprising:
   in the middle region of the disk clamp, a declination region adjacent the inner peripheral region and an inclination region disposed between the declination region and the outer peripheral region.

10. The disk drive of claim 9 wherein the clamp holes are disposed within the declination region of the middle region of the disk clamp.

11. A disk clamp of a disk drive for securing a disk to a rotary hub of a spindle motor in the disk drive, the disk having a recording surface, the rotary hub having a plurality of hub holes, each for receiving one of a plurality of fasteners, the disk clamp comprising:
   a substantially annular body, the annular body comprising;
      a stiffened inner peripheral region, a stiffened outer peripheral region, and a middle region between the inner and outer peripheral regions having substantially less stiffness than either of the inner and outer peripheral regions and having a plurality of clamp holes, each for receiving one of the plurality of fasteners, the inner peripheral region including a bend and a portion extending from the bend towards the recording surface, the outer peripheral region having a cross section that defines a curl, the curl including a portion extending toward the recording surface and including a disk surface contact zone, the curl defining an as which is parallel to the recording surface, and the curl extending through an angle which is greater than 180 degrees.

12. The disk clamp of claim 11 wherein the disk clamp is made from stainless steel.

13. The disk clamp of claim 12 wherein the plurality of fasteners for coupling the disk clamp to the rotary hub are each received through a respective clamp hole into the corresponding hub hole to impose on the disk clamp a respective portion of an aggregate axial clamping force for securing the disk to the rotary hub.

14. The disk clamp of claim 11 wherein the middle region stiffness is sufficiently low with respect to the inner and outer peripheral region stiffness to distribute the aggregate axial clamping force over the disk surface contact zone of the disk clamp.

15. The disk clamp of claim 14 wherein the disk clamp middle region stiffness is such as to distribute the aggregate axial clamping force over the disk surface contact zone with a maximum-to-minimum force ratio of about four-to-one.

16. The disk clamp of claim 11 further comprising:
   in the middle region of the disk clamp, a declination region adjacent the inner peripheral region and an inclination region disposed between the declination region and the outer peripheral region.

17. The disk clamp of claim 16 wherein the clamp holes are disposed within the declination region of the middle region of the disk clamp.

* * * * *